(12) United States Patent
Ng

(10) Patent No.: US 11,910,503 B2
(45) Date of Patent: Feb. 20, 2024

(54) SYSTEM AND METHOD FOR DETERMINING A CHARACTERISTIC OF AN INPUT SIGNAL

(71) Applicant: SIGNIFY HOLDING B.V., Eindhoven (NL)

(72) Inventor: Poh Keong Ng, Medford, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 281 days.

(21) Appl. No.: 17/608,107

(22) PCT Filed: May 7, 2020

(86) PCT No.: PCT/EP2020/062662
§ 371 (c)(1),
(2) Date: Nov. 1, 2021

(87) PCT Pub. No.: WO2020/225344
PCT Pub. Date: Nov. 12, 2020

(65) Prior Publication Data
US 2022/0312563 A1    Sep. 29, 2022

Related U.S. Application Data

(60) Provisional application No. 62/844,678, filed on May 7, 2019.

(30) Foreign Application Priority Data

May 24, 2019    (EP) ..................................... 19176367

(51) Int. Cl.
*H05B 45/10*    (2020.01)
*H05B 45/355*    (2020.01)
*H05B 45/375*    (2020.01)

(52) U.S. Cl.
CPC ........... *H05B 45/375* (2020.01); *H05B 45/10* (2020.01); *H05B 45/355* (2020.01)

(58) Field of Classification Search
CPC ..... H05B 45/10; H05B 45/355; H05B 45/375
(Continued)

(56) References Cited

U.S. PATENT DOCUMENTS

2012/0139442 A1*    6/2012    Soleno ................... H05B 45/10
                                                     315/294
2014/0265935 A1    9/2014    Sadwich et al.
(Continued)

FOREIGN PATENT DOCUMENTS

GB    2507982 A    5/2014
TW    201336349 A    9/2013

*Primary Examiner* — William Hernandez

(57) ABSTRACT

An LED power supply (100) configured to detect a characteristic of an input signal, includes a Buck power factor control circuit (D1, U1, Q1, D2, L1, C1) being configured to receive an input signal, the input signal (VAC) being referenced to a power ground, and to output an output signal, the output signal ($V_{out}$) being referenced to an output ground, wherein the output ground is level shifted with respect to the power ground; and a controller (106) configured to output an LED drive signal, the controller referenced to the output ground, wherein the controller is configured to determine the characteristic of the input signal according to a switching time of the Buck power factor control circuit, the switching time of the Buck power factor control circuit being determined by the controller according to a switching signal referenced to the output ground.

15 Claims, 8 Drawing Sheets

(58) Field of Classification Search
USPC .................................. 315/247; 327/108, 109
See application file for complete search history.

(56) References Cited

U.S. PATENT DOCUMENTS

| | | | |
|---|---|---|---|
| 2015/0373796 A1* | 12/2015 | Bahrehmand | H05B 45/325 |
| | | | 315/129 |
| 2017/0208660 A1 | 7/2017 | Hilgers et al. | |

* cited by examiner

SYSTEM AND METHOD FOR DETERMINING A CHARACTERISTIC OF AN INPUT SIGNAL

CROSS-REFERENCE TO PRIOR APPLICATIONS

This application is the U.S. National Phase application under 35 U.S.C. § 371 of International Application No. PCT/EP2020/062662, filed on May 7, 2020, which claims the benefit of U.S. patent application Ser. No. 62/844,678, filed on May 7, 2019, and European Patent Application filed on May 24, 2019. These applications are hereby incorporated by reference herein.

FIELD OF THE DISCLOSURE

The following relates to systems and method for determining a characteristic of an input signal to a Buck power factor controller (PFC) circuit, according to a switching time of the Buck power factor control circuit.

BACKGROUND

Color changing LED fixtures and ELV dimmable white LED fixtures, due to their different electrical requirements, typically require separate designs. The former is digitally controlled while the latter is typically analog controlled. To reduce design-to-market time, white fixtures are usually converted from a color fixture by replacing color LEDs with white LEDs, and are thus controlled with the same digital connectivity and interface, e.g., CKDMX/Data Enabler Pro. As such, white fixtures are not ELV (phase-cut dimming) compatible and require digital dimming to operate. This causes unnecessary inconvenience to users with existing ELV controllers, since those users now have to reinstall their electrical systems in order to use digitally-dimmed (via, e.g., CKDMX) white fixtures. Accordingly, there exists a need in the art to allow digitally-dimmed white fixtures to accept an ELV LED drive signal from an ELV controller.

Many LED fixtures use a Buck power factor control circuit (PFC), because it offers superior common-mode noise, a higher with flatter efficiency profile, and smaller magnetic components over, for example, a Flyback power factor control circuit. However, in order to accept an ELV LED drive signal and dim appropriately, the microcontroller, from which the LED drive signal originates, of the white LED fixture must first interpret the phase information of the ELV LED drive signal. But the microcontroller, when used with a Buck factor control circuit, is generally referenced to the output ground of the Buck power-factor control circuit, which may be level-shifted with respect to the ground of the input signal as a result of the power MOSFET. This means that the microcontroller cannot directly read and interpret the input voltage without a level-shifter, requiring expensive components, such as optocouplers.

US 2017/208660 A1 relates to a driver circuit for driving an LED arrangement, comprising: a power source for providing the LED arrangement with a regulated driving current, said converter being adapted to convert an dimmed input power into said driving current; a current sensing element in series with the LED arrangement and adapted to sense the LED arrangement current through the LED arrangement; a bleeder circuit having a bleeding path connected in parallel with the LED arrangement, adapted for removing a bleed portion from the driving current so as to decrease the output power of the LED arrangement; and a control circuit for enabling said bleeder circuit when the LED arrangement current sensed by the current sensing element is below a threshold so as to further dim the LED arrangement down.

Additionally, manufacturers often configure LED fixtures to deliver usage data for remote monitoring. But, for the reasons stated above, the microcontroller cannot directly interpret the input voltage, to deliver to the manufacturer. Accordingly, there exists a need in the art for a microcontroller, referenced to the output ground of the Buck PFC circuit, configured interpret the characteristics of the input voltage (e.g., voltage, frequency, and phase angle) without the use of a level shifter.

SUMMARY OF THE DISCLOSURE

There is continued need to inexpensively determine a characteristic of an input signal of a Buck PFC circuit. Various examples and implementations herein are directed to a system and method for determining a characteristic of an input signal according to a switching time (switching time, as used herein, refers to the times at which the MOSFET Q1 begins switching and ceases switching) of the Buck PFC circuit. The switching time may be measured at a switching signal, referenced to the output ground of the Buck PFC circuit, by a controller that is also referenced to the output ground of the Buck PFC circuit. From the switching time of the switching signal, the conduction time and conduction frequency of the Buck PFC circuit may be determined, and, from those values, characteristics such as frequency, phase angle, and voltage of the input signal may be determined. Accordingly, a controller referenced to the output ground may determine the characteristic of the input signal, for purposes of data collection or dimming, without the use of an expensive and bulky level shifter.

According to an aspect, an LED power supply configured to detect a characteristic of an input signal, includes: a Buck power factor control circuit being configured to receive an input signal, the input signal being referenced to a power ground, and to output an output signal, the output signal being referenced to an output ground, wherein the output ground is level shifted with respect to the power ground; and a controller configured to output an LED drive signal, the controller referenced to the output ground, wherein the controller is configured to determine the characteristic of the input signal according to a plurality of switching times of the Buck power factor control circuit, the plurality of switching times of the Buck power factor control circuit being determined by the controller according to a switching signal referenced to the output ground.

In an example, the characteristic of the input signal is at least one of: a voltage, a phase angle, and a frequency.

In an example, the characteristic of the input signal is a phase angle, wherein the controller is further configured to adjust the LED drive signal to dim at least one LED according to the phase angle.

In an example, the controller is further configured to report the characteristic to a remote server.

In an example, the plurality of switching times of the Buck power factor control circuit is measured according to a rising edge or falling edge of an envelope of the switching signal.

In an example, the characteristic is a voltage, wherein the voltage is determined according to a conduction time and a conduction frequency of the switching signal, wherein the conduction time and the conduction frequency of the input signal may be determined from the plurality of switching times of the switching signal.

In an example, the switching signal is measured as a voltage across or a current through one of: a power MOSFET, a freewheeling diode, or a Buck inductor.

In an example, switching signal is measured at a secondary winding of a transformer, the secondary winding being referenced to output ground.

In an example, a primary winding of the transformer is in series with one of: a power MOSFET, a freewheeling diode, or a Buck inductor.

In an example, a primary winding of the transformer is formed by a Buck inductor.

According to another aspect, a controller being referenced to an output ground of a Buck power factor control circuit, the controller comprising a non-transitory storage medium and a processor that, when executing instructions stored in the non-transitory storage medium, performs steps including: receiving a switching signal, the switching signal being referenced to the output ground; determining, from the switching signal, a plurality of switching times of the Buck power factor control circuit; and determining, from the plurality of switching times, a characteristic of an input signal to the Buck power factor control circuit.

In an example, the controller is configured to dim at least one LED according to the characteristic of the input signal.

In an example, the controller is configured to transmit the characteristic to a remote server.

In an example, the characteristic of the input signal is at least one of: a voltage, a conduction phase, and a frequency.

According to another aspect, an LED power supply configured to detect a characteristic of an input signal, includes: a Buck power factor control circuit being configured to receive an input signal, the input signal being referenced to a power ground, and to output an output signal, the output signal being referenced to an output ground, wherein the output ground is level shifted with respect to the power ground; and a controller configured to output an LED drive signal, the controller referenced to the output ground, wherein the controller is configured to determine the characteristic of the input signal according to a plurality of switching times of the Buck power factor control circuit, the plurality of switching times of the Buck power factor control circuit being determined by the controller according to a switching signal referenced to the output ground, wherein the switching signal is measured at a secondary winding of a transformer, the secondary winding being referenced to output ground, a primary winding of the transformer being formed by a Buck inductor, wherein the plurality of switching times of the Buck power factor control circuit is measured according to a rising edge or falling edge of an envelope of the switching signal.

These and other aspects of the various embodiments will be apparent from and elucidated with reference to the embodiment(s) described hereinafter.

DETAILED DESCRIPTION OF EMBODIMENTS

Various examples described herein are directed toward an LED fixture with a Buck PFC and including a controller configured to determine a characteristic of the input AC voltage from the Buck PFC switching times. Because the switching times of a Buck PFC may be directly measured by a controller referenced to the output ground, the characteristics of the input voltage may be determined without the use of a level shifter.

Figure 1A:
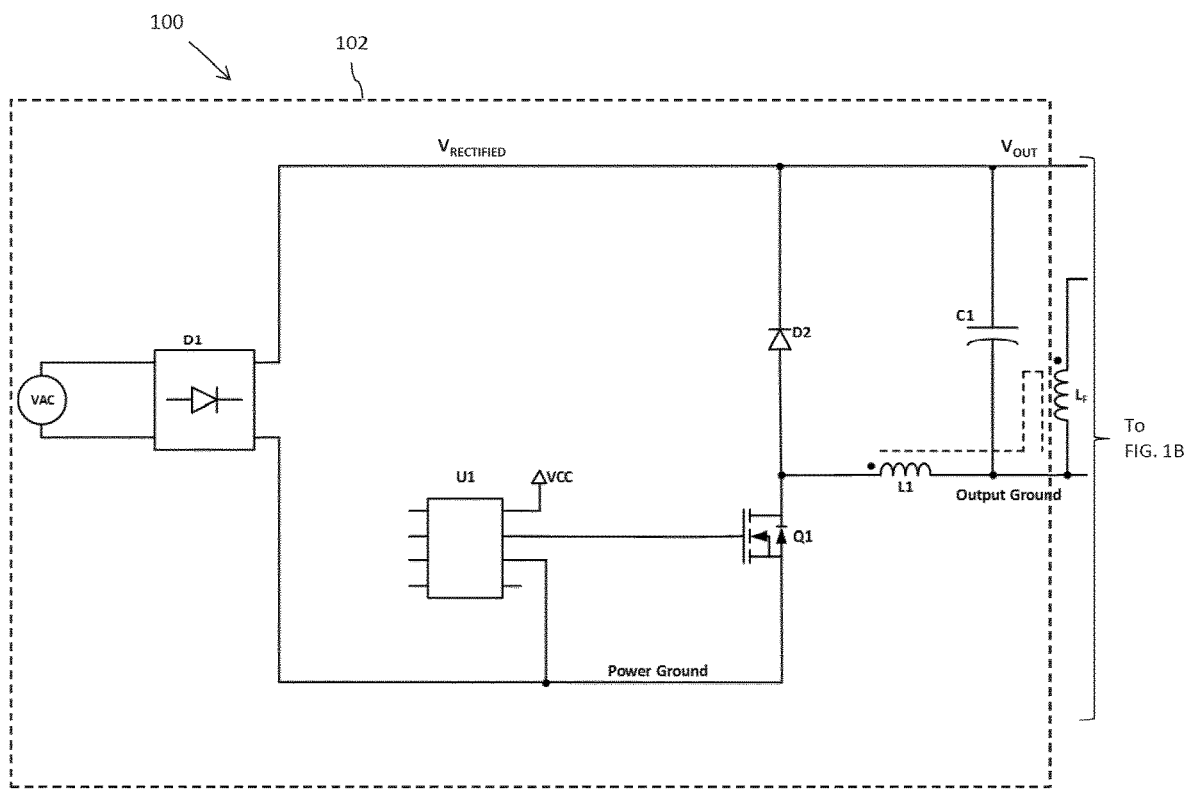
FIG. 1A is a schematic of an LED power supply including an inverted Buck power factor control circuit, according to an example.
Figure 1B:
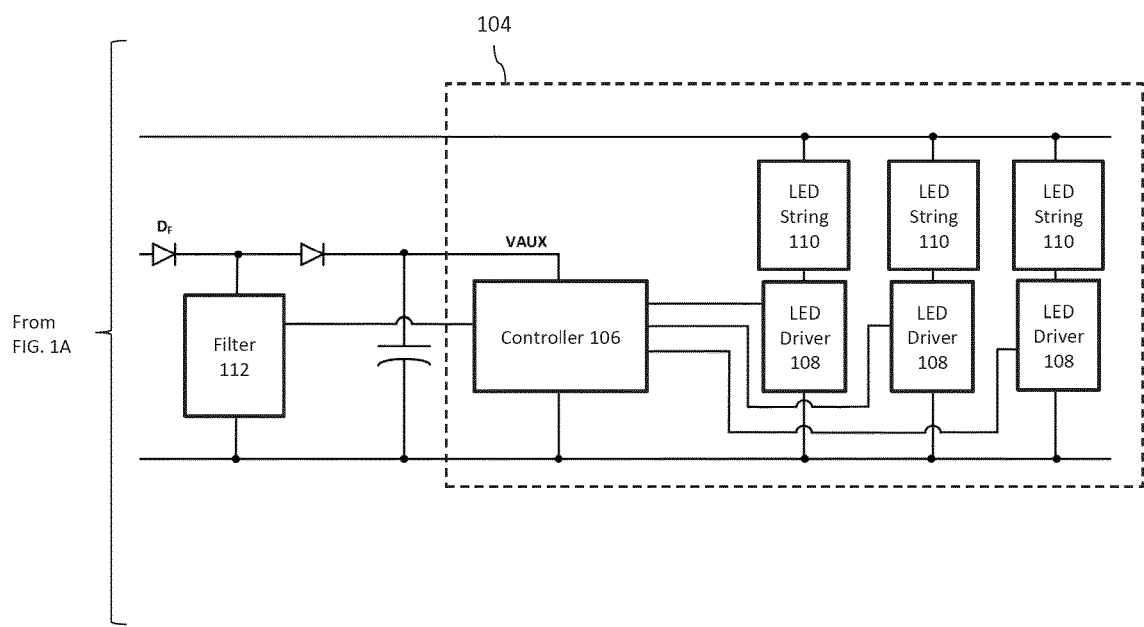
FIG. 1B is a schematic of an LED power supply including an inverted Buck power factor control circuit, according to an example.

Referring to FIGS. 1A and 1B, there is shown a circuit 100 for supplying power to an LED fixture, including a first stage 102, comprising an inverted Buck PFC circuit, and a second stage 104, comprising an LED driving circuit. As shown, the inverted Buck power factor correction circuit of the first stage 102 includes a bridge rectifier D1, a PFC controller IC U1, a power MOSFET Q1, a freewheeling diode D2, a Buck inductor L1, and an output capacitor C1. The input to the first stage 102 is an alternating input signal VAC. Input signal VAC is typically a mains input voltage, and thus may be 100, 120, 230, 240, or 277 V, and have a frequency of 50 Hz or 60 Hz, although other voltages and frequencies are contemplated. Although an inverted Buck power factor correction circuit is shown in FIGS. 1A, 1B, and 4-7, it should be understood that processes and methods described herein for detecting a characteristic of an input signal are generally applicable to Buck PFC circuits and Buck-derived PFC circuits.

The output of the bridge rectifier D1 will be rectified AC voltage $V_{rectified}$. The inverted Buck PFC circuit largely functions to convert the rectified AC voltage $V_{rectified}$ to a DC voltage output $V_{out}$ while maintaining a high power factor and low harmonic distortion. It should be understood that the representation of the inverted Buck PFC circuit in FIGS. 1A and 1B has been simplified; the inverted Buck PFC circuit is known in the art, and thus does not require full reproduction in this disclosure.

The input signal VAC and rectified AC voltage signal $V_{rectified}$ are referenced to the same ground, referred to herein as "power ground." PFC controller IC U1, power MOSFET Q1, and freewheeling diode D2 are also referenced to power ground. The output $V_{out}$ of the first stage 102, however, is referenced to a different ground, referred to herein as "output ground," which is level-shifted with respect to the power ground, as a result of the location and operation of power MOSFET Q1.

The second stage 104 receives $V_{out}$, which it uses to power LEDs. The second stage 104 may comprise a controller 106, configured to output a drive signal to one or more LED drivers 108. The LED drivers 108, as shown, may each be positioned in series with a respective LED string (each LED string may include at least one LED). The LED drivers 108, in response to the drive signal, condition the current through the respective LED string 110. Thus, controller 106, via the drive signal, may effect dimming or color changes of the LEDs. It should be understood that any suitable LED driver may be used. Furthermore, although multiple LED strings are shown, only one LED string may be powered by the second stage 104. As will be described below, controller 106 is configured to determine a characteristic (e.g., voltage, current, or phase angle) of the input signal according to the switching times of the inverted Buck PFC circuit.

As will be described in detail below, the combination of diode DF and filter 112 function to detect an envelope of the switching waveform present at Buck inductor L1. The rising edge and falling edge of the envelope signal may be detected by controller 106 in order to determine the switching times of the inverted Buck PFC circuit.

The controller 106 may comprise a non-transitory storage medium and processor. The non-transitory storage medium may be configured to store program instructions that, when executed by the processor, carry out the steps of methods and processes described herein. It should be understood that, while a single microcontroller IC is shown, the controller may be implemented as a combination of microcontroller ICs, and/or any combination of hardware, firmware, and/or software configured to carry out the steps and processes described herein.

Once the characteristic of the input signal has been determined, controller 106 may be configured to transmit (either wired or wirelessly) the determined characteristic to a connected mobile device, or local or remote server. This may be used, for example, for remote monitoring of usage data and diagnostics. The connection, as appropriate, may be an internet connection, or local network connection. The controller 106, accordingly, may transmit the data representative of the determined characteristic over WiFi, Bluetooth, Zigbee, or any other suitable protocol for wireless connection.

Additionally, or alternatively, controller 106 may be configured to dim the LEDs according to the measured phase angle of the input signal VAC. Thus, the LED drive signal output by the controller 106 to the LEDs drivers 108 may implement dimming of the LEDs that is proportional to the phase angle of the input signal VAC.

Figure 2:
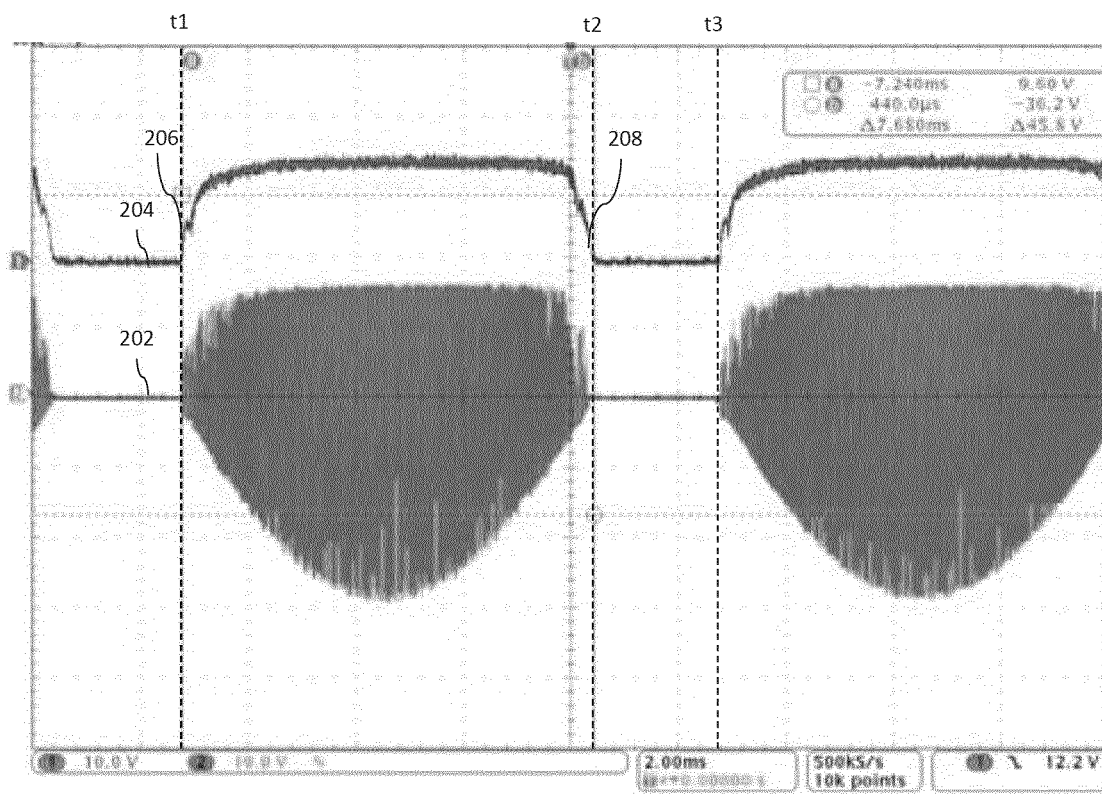
FIG. 2 is a graph depicting an example switching signal and envelope signal, according to an embodiment.

As mentioned above, controller 106 is referenced to output ground, and thus cannot directly measure the input signal VAC or rectified AC voltage $V_{rectified}$. Controller 106 is, therefore, configured to determine a characteristic (e.g., voltage, frequency, and/or phase angle) of input signal VAC, via the measured switching times of the inverted Buck PFC circuit. The switching times are the times that the inverted PFC begins or ceases conducting (the times at which the power MOSFET Q1 begins switching and ceasing switching). FIG. 2 for example, shows a plot of a switching signal 202, measured at secondary winding LF on the anode of DF. As shown, the inverted Buck PFC circuit will only begin switching at time $t_1$, which is when inverted AC voltage $V_{rectified}$ is greater than $V_{out}$ and will stop switching at time $t_2$, which is when the rectified AC voltage $V_{rectified}$ is less than AC voltage $V_{out}$. The inverted Buck PFC circuit will thus start conducting and stop conducting once during each half-cycle. The switching times (e.g., $t_1$ and $t_2$) may be used to yield the conduction frequency and the conduction time of the inverted Buck PFC circuit, which, in turn, may be used to determine characteristics of the input signal VAC. It should be understood that when the inverted Buck PFC circuit turns ON (begins converting $V_{rectified}$ to output voltage $V_{out}$), the power MOSFET Q1 will switch at a frequency that is much greater than the frequency of the input signal VAC. Thus, time $t_1$ marks the time at which the power MOSFET Q1 begins rapidly switching ON/OFF, and time $t_2$ marks the time at which the power MOSFET Q1 ceases switching. Taken together, times $t_1$ and $t_2$, accordingly, respectively mark the time at which the inverted Buck PFC circuit turns ON, which occurs when the power MOSFET Q1 begins rapidly switching ON/OFF, and the time at which the inverted Buck PFC circuit turns OFF, which occurs when the power MOSFET Q1 ceases switching ON/OFF.

For example, the conduction frequency of the inverted Buck PFC circuit may be used to determine the frequency of input signal VAC. The conduction frequency, as used herein, is the frequency at which the inverted Buck PFC circuit turns ON (e.g., $t_1$ and $t_3$) or the frequency at inverted Buck PFC turns OFF (e.g., $t_2$). Accordingly, conduction frequency may be measured as the time elapsed between the start of switching during one half-cycle (e.g., $t_1$), and the start of switching during the next half-cycle (e.g., $t_3$), or, alternatively, by measuring by the time elapsed between the end of switching one half-cycle (e.g., $t_2$) and the end of switching during the next half-cycle (not shown in FIG. 2). The time elapsed between a switching action of sequential half-cycles will yield a frequency twice the frequency of input signal VAC and may thus be divided by two to render the frequency of input signal VAC. It should be understood that the time may alternatively be measured between alternate half-cycles.

Similarly, the phase-angle of the input signal VAC may be determined by measuring the conduction time, which is proportional to the phase-angle of the input waveform. The conduction time of the inverted Buck PFC is the time from when the inverted Buck PFC begins conducting (e.g., T1) to when it stops conducting (e.g., T2).

From the measured conduction frequency and conduction time, the input voltage may be determined. Intuitively, conduction time of the inverted Buck PFC circuit will vary as a function of input voltage and frequency. Indeed, a larger input voltage will yield longer conduction times than smaller input voltages. And a smaller frequency will similarly yield longer conduction times than larger frequencies. The input voltage may be calculated as follows:

$$V_{rectified}(t) = \sqrt{2} V_{AC} \sin(2\pi f_{AC} t)$$

As shown in FIG. 2, the inverted Buck PFC will only conduct when $V_{rectified}$ is greater than $V_{out}$, thus the conduction time $t_{conduction}$. The start and stop time of the conduction period are labeled $t_1$ and $t_2$, and thus the $t_{conduction}$ may be written as $t_1 < t_{conduction} < t_2$. During a half period, the PFC idle period (i.e., when Q1 is not switching) may be written as $0.5 T_{AC} - t_{conduction}$, where $T_{AC}$ is the period of the $V_{AC}$ half-cycle. The conduction start and stop times, $t_1$ and $t_2$, can be derived by equating $V_{rectified}$ to $V_{out}$ as follows:

$$V_{OUT} = \sqrt{2} V_{AC} \sin(2\pi f_{AC} t)$$

where $f_{AC}$ is the frequency of input signal $V_{AC}$. Accordingly, the start and stop times may be written as:

$$t = \frac{\sin^{-1}\left(\frac{V_{OUT}}{\sqrt{2} V_{AC}}\right)}{2\pi f_{AC}}$$

For simplicity, considering only the first quadrant of the half-cycle, the start time may be written as:

$$t_1 = \frac{\sin^{-1}\left(\frac{V_{OUT}}{\sqrt{2}\,V_{AC}}\right)}{2\pi f_{AC}}$$

Due to the symmetry of the half-cycle, the conduction period may be written as follows:

$$t_{conduction} = 0.5 T_{AC} - 2t_1 = 1/(2f_{AC}) - 2t_1$$

Figure 3:
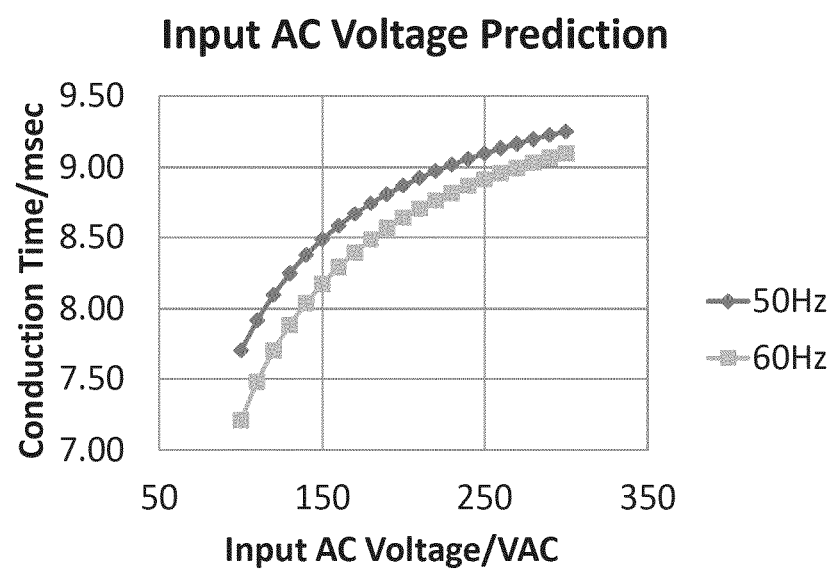
FIG. 3 is a graph depicting voltage against measured conduction time, according to an example.

Based on the above, for a given measured frequency, the input AC voltage may be plotted against conduction time. For example, FIG. 3 shows the AC voltage plotted against conduction time for 50 Hz and 60 Hz. Thus, a controller 106, having received values of conduction time and frequency, may determine the value of the input voltage. In an example, the controller 106 may store a look-up table, which correlates measured conduction time and frequency with voltage. The look-up may be generated according to the above equations, or may be determined empirically. One such lookup table is provided as an example below:

TABLE I

| Measured Conduction Time | Measured Frequency | AC Voltage Prediction |
|---|---|---|
| 7.68 ms | 50 Hz | 100 VAC |
| 6.4 ms | 60 Hz | 100 VAC |
| 8.04 ms | 50 Hz | 120 VAC |
| 6.66 ms | 60 Hz | 120 VAC |
| 9.3 ms | 50 Hz | 230 VAC |
| 7.9 ms | 60 Hz | 230 VAC |
| 9.44 ms | 50 Hz | 240 VAC |
| 8.42 ms | 60 Hz | 240 VAC |
| 9.48 ms | 50 Hz | 277 VAC |
| 7.92 ms | 60 Hz | 277 VAC |

The switching times, from which the conduction time and frequency of the inverted Buck PFC circuit may be determined, may be measured at a switching signal of the inverted Buck PFC circuit. Indeed, the switching signal, as used herein, is any current or voltage from which the switching times may be determined. Generally, the switching signal may be measured at the freewheeling diode D1, power MOSFET Q1, or Buck inductor L1, as the switching of the MOSFET Q1 causes freewheeling diode D1 to switch ON and OFF and causes the Buck inductor voltage to change polarity. The voltage across or the current through any of these components will thus yield the switching signal from which the conduction time and frequency of the inverted Buck PFC may be determined, and, consequently, a characteristic of the input signal may be determined. Of these components, only the Buck inductor L1 is on the output ground, thus the voltage across the Buck inductor L1 or the current through the Buck inductor L1 may be measured by the controller 106 without the need for a level shifter.

Figure 4:
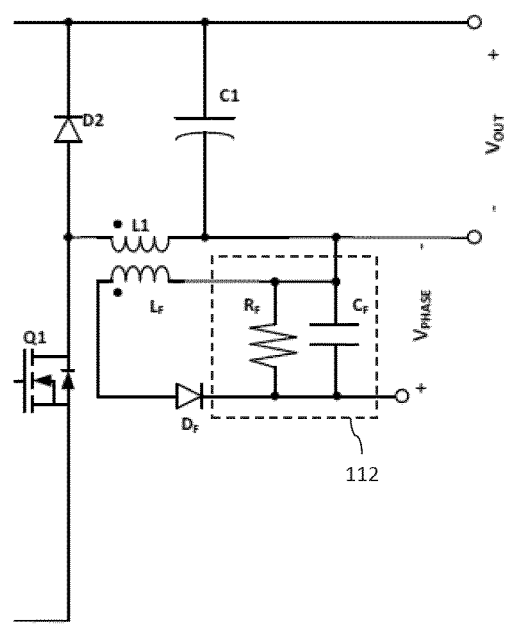
FIG. 4 is a schematic of a circuit for measuring a switching time of a Buck power factor control circuit, according to an example.

The switching times may be measured in any suitable fashion, some examples of which are depicted in FIGS. 4-7. In the first of these examples, shown in FIGS. 1 and 3, a secondary winding LF is magnetically coupled with the Buck inductor L1. The voltage across secondary winding LF will thus be proportional (depending on the number of windings) with the voltage across Buck inductor L1. The voltage across L1 may be passed through a rectifying diode DF and, as shown in FIG. 4, low-pass filter 112 formed by RF and CF, which together form an envelope detector, yielding an envelope signal that may be passed to the controller 106. The rising edge and falling edge of the envelope signal may be read by the controller 106 to measure the switching times of the inverted Buck PFC circuit, and, from the switching times, determine the conduction frequency (equivalent to a multiple of the frequency of VAC) and the conduction time (proportional to the phase angle of input signal VAC). For example, as shown in FIG. 3, the rising edge 206 of an example envelope signal 204 may be read to determine the start of PFC conduction and the falling edge 208 of the example envelope signal 204 may be read to determine the end of PFC conduction. Thus, the difference between the detected rising edge of the envelope signal will determine the conduction time, and the difference between consecutive rising edges will determine the conduction frequency.

Many LED power supplies, like power supply 100, include an existing secondary winding LF magnetically coupled to Buck inductor L1, used to power controller 106. This configuration is shown, for example, in FIGS. 1A and 1B. Thus, the examples of FIGS. 1 and 3 conveniently repurpose the secondary winding LF to measure the switching signal.

While an envelope detector formed by diode DF, resistor RF, and capacitor CF is shown, it should be understood that any envelope detector may be used. For example, the envelope detector 114, formed by the parallel combination of resistor RF and CF, may instead be formed by any suitable low-pass filter, passive or active. Alternatively, the envelope detection may be performed by controller 106, in which case, the voltage measured across L1 may be directly input to controller 106.

Figure 5:
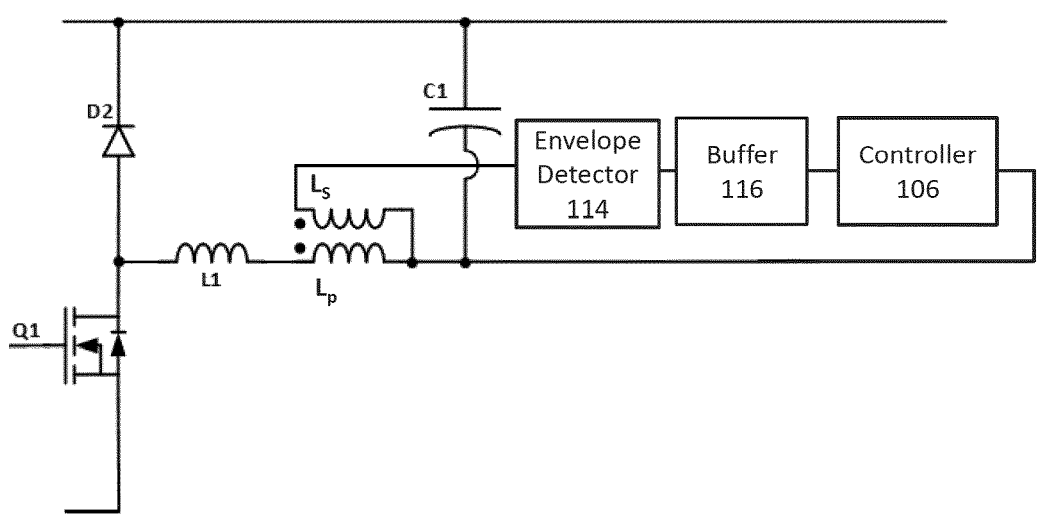
FIG. 5 is a schematic of a circuit for measuring a switching time of a Buck power factor control circuit, according to an example.

FIG. 5 shows an example of how to measure current through the L1. In this example, the current through L1 will likewise be input to the primary winding $L_p$ of current sense transformer positioned in series with L1. The voltage across secondary winding $L_s$, proportional to the current through the primary winding $L_p$ and L1, will be input to controller 106 via low-pass filter and buffer. Envelope detector 114, like the example of FIGS. 1 and 3, functions to detect the envelope of the voltage signal across the secondary winding. This example may further include buffer 116, formed, for example, by an op-amp (although any suitable buffer may be used), to isolate controller 106 from the inverted Buck PFC circuit.

Figure 6:
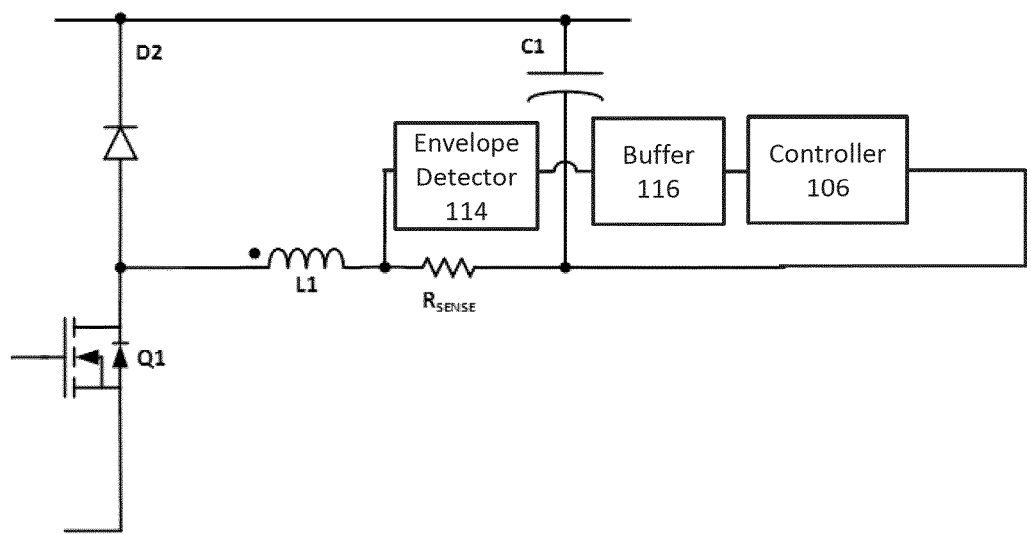
FIG. 6 is a schematic of a circuit for measuring a switching time of a Buck power factor control circuit, according to an example.

FIG. 6 depicts an example similar to the example of FIG. 5, however, instead of current sensor transformer T1, current sense resistor $R_{sense}$ has been substituted. Current sense resistor $R_{sense}$ will generate a voltage proportional to the current through L1. Like the voltage across secondary winding of transformer T1, the voltage across secondary winding may be input to envelope detector 114 and to buffer 116. The example of FIG. 6 is not as desirable as the examples FIG. 5 as resistor $R_{sense}$ will introduce undesirable losses to the inverted Buck PFC circuit. It should also be understood that the current through current sense resistor will generate a negative voltage across current sense resistor with respect to output ground. To account for this, buffer 116 may be an inverting buffer to change the voltage to a positive voltage.

Figure 7:
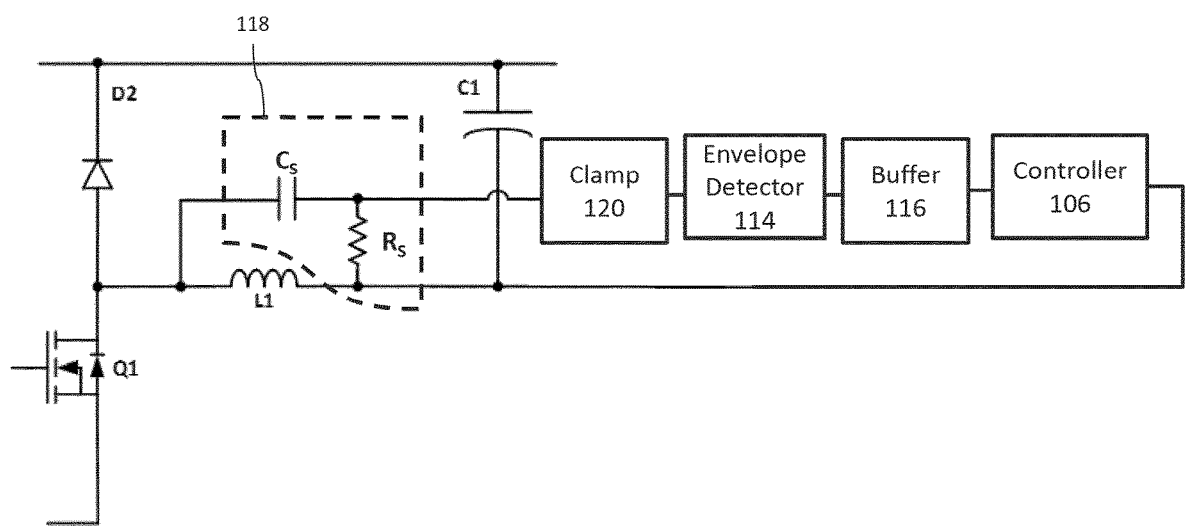
FIG. 7 is a schematic of a circuit for measuring a switching time of a Buck power factor control circuit, according to an example.

In another example, shown in FIG. 7, the current through controller 106 may be measured by snubber circuit 118, formed by the series combination of capacitor Cs and resistor $R_S$, placed in parallel with inductor L1. The voltage across resistor $R_{sense}$ will be generally proportional to the current through inductor L1. This voltage, like the examples of FIG. 5 and FIG. 6, may be input to the envelope detector 114 and buffer 116. However, because the voltage of resistor $R_s$ may exceed the maximum voltage that may be input to controller 106, a voltage clamp 120 may be employed to protect the controller 106. The voltage clamp 120 functions to limit the voltage to below a threshold. Any suitable voltage clamp may be used.

As mentioned above, the switching signal present at Buck inductor L1 is similarly present at freewheeling diode D1 and power MOSFET Q1. Thus, similar to the example of FIG. 5 current sense transformer may be placed in series with freewheeling diode D1 (e.g., at the anode or cathode of freewheeling diode D1), or in series with power MOSFET Q1 (e.g., at the drain side of Q1). However, to avoid the use of an expensive level shifter, the secondary winding of current transformer should remain referenced to output ground, thus the switching signal at Q1 or D1 measured at the secondary winding of current transformer will be referenced to output ground. Like the example of FIG. 5 these alternative placements of current sense transformer T1 may similarly employ an envelope detector and buffer, for determining the envelope signal and for isolating the controller, respectively.

In alternative embodiments, RC snubber circuit 118 may be placed across either freewheeling diode D1 or power MOSFET Q1. Similarly, current sense resistor $R_{sense}$ may be placed in series freewheeling diode D1 or power MOSFET Q1. But both of these examples will require the use of a level shifter to shift the voltage across freewheeling diode D1 or power MOSFET Q1 to a voltage referenced to the output ground. A level shifter may be any suitable level shifter known in the art, and may include for example, an optocoupler having the transistor side referenced to the output ground.

In each of the above examples, the envelope detector 114 may be implemented by any suitable low-pass filter, such as a passive (e.g., RC filter) or active filter (e.g., using an operational amplifier). Alternatively, instead of a low-pass filter, the controller 106 may be configured to detect the envelope of the switching signal.

Once the characteristic of the input signal has been determined, the controller 106 may transmit the characteristic, or statics or other data based on the characteristic to a mobile device, or local or remote server. For example, the characteristic may be reported to a user or manufacturer via the wired or wireless connection of controller 106. This information may be used to collect aggregate data from a multitude of devices operating in the field, or may be used to maintain an LED light fixture or diagnose a specific malfunctioning LED light fixture. Furthermore, any example in which a buffer is used may use any suitable buffer for isolating the controller 106 from the inverted Buck PFC circuit.

Alternatively, or in combination, controller 106 may be configured to dim the LEDs according to the determined phase angle (derived, as mentioned above, from the conduction time of the LEDs) of the input signal. For example, the LEDs may be dimmed proportionally, linearly, or exponentially, based on the phase angle of the input signal. The controller may implement the dimming of the LEDs, by, for example, modulating the amplitude or pulse-width of the LED drive signal, in order to adjust the instant or average current flowing the LEDs. It should be understood that the dimming may be implemented according to any suitable method for dimming LEDs.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

The invention claimed is:

1. An LED power supply configured to detect a characteristic of an input signal, comprising:
   a Buck power factor control circuit being configured to receive the input signal, the input signal being referenced to a power ground, and to output an output signal, the output signal being referenced to an output ground, wherein the output ground is level shifted with respect to the power ground; and
   a controller configured to output an LED drive signal, the controller referenced to the output ground, wherein the controller is configured to determine the characteristic of the input signal measuring a plurality of switching times of the Buck power factor control circuit, and determining conduction times and/or conduction frequencies of the Buck power factor control circuit, the plurality of switching times of the Buck power factor control circuit being determined by the controller according to a switching signal referenced to the output ground.

2. The LED power supply of claim 1, wherein the characteristic of the input signal is at least one of: a voltage, a phase angle, and a frequency.

3. The LED power supply of claim 1, wherein the characteristic of the input signal is a phase angle, wherein the controller is further configured to adjust the LED drive signal to dim at least one LED according to the phase angle.

4. The LED power supply of claim 1, wherein the controller is further configured to report the characteristic to a remote server.

5. The LED power supply of claim 1, wherein the plurality of switching times of the Buck power factor control circuit is measured according to a rising edge or falling edge of an envelope of the switching signal.

6. The LED power supply of claim 1, wherein the characteristic is a voltage, wherein the voltage is determined according to a conduction time and a conduction frequency of the switching signal, wherein the conduction time and the conduction frequency of the input signal may be determined from the plurality of switching times of the switching signal.

7. The LED power supply of claim 1, wherein the switching signal is measured as a voltage across or a current through one of: a power MOSFET, a freewheeling diode, or a Buck inductor.

8. The LED power supply of claim 1, wherein switching signal is measured at a secondary winding of a transformer, the secondary winding being referenced to output ground.

9. The LED power supply of claim 8, wherein a primary winding of the transformer is in series with one of: a power MOSFET, a freewheeling diode, or a Buck inductor.

10. The LED power supply of claim 8, wherein a primary winding of the transformer is formed by a Buck inductor.

11. The LED power supply of claim 1,
wherein the switching signal is measured at a secondary winding of a transformer, the secondary winding being referenced to output ground, a primary winding of the transformer being formed by a Buck inductor,
wherein the plurality of switching times of the Buck power factor control circuit is measured according to a rising edge or falling edge of an envelope of the switching signal.

12. A controller being referenced to an output ground of a Buck power factor control circuit, the controller comprising a non-transitory storage medium and a processor that, when executing instructions stored in the non-transitory storage medium, performs steps comprising:
receiving a switching signal, the switching signal being referenced to the output ground;
measuring, from the switching signal, a plurality of switching times of the Buck power factor control circuit and determining conduction times and/or conduction frequencies of the Buck power factor control circuit; and
determining, from the plurality of switching times, conduction times and conduction frequencies, a characteristic of an input signal to the Buck power factor control circuit.

13. The controller of claim 12, wherein the controller is configured to dim at least one LED according to the characteristic of the input signal.

14. The controller of claim 12, wherein the controller is configured to transmit the characteristic to a remote server.

15. The controller of claim 12, wherein the characteristic of the input signal is at least one of: a voltage, a conduction phase, and a frequency.

* * * * *